United States Patent [19]

Andrews et al.

[11] 3,853,920

[45] Dec. 10, 1974

[54] PRODUCTION OF SODIUM ERYTHORBATE CRYSTALS OF MICROCRYSTALLINE SIZE

[75] Inventors: Stuart R. Andrews, North Brunswick; Lewis D. Morse, Princeton, both of N.J.

[73] Assignee: Merck & Co., Inc., Rahway, N.J.

[22] Filed: Oct. 28, 1971

[21] Appl. No.: 193,587

Related U.S. Application Data

[63] Continuation-in-part of Ser. No. 879,912, Nov. 20, 1969, abandoned, and a continuation-in-part of Ser. No. 100,782, Dec. 22, 1970, abandoned.

[52] U.S. Cl. ............................. 260/343.7, 260/707
[51] Int. Cl. .............................................. C07d 5/12

[58] Field of Search ................................. 260/707

[56] References Cited
UNITED STATES PATENTS

3,064,010   11/1962   Huffman ........................ 260/343.7

*Primary Examiner*—Richard J. Gallagher
*Assistant Examiner*—Jose Tovar
*Attorney, Agent, or Firm*—Frank M. Mahon; Thomas E. Arther; Harry E. Westlake, Jr.

[57] ABSTRACT

Microcrystals of sodium erythorbate are obtained by combining as rapidly as possible a saturated solution of the erythorbate and sodium chloride.

9 Claims, No Drawings

PRODUCTION OF SODIUM ERYTHORBATE CRYSTALS OF MICROCRYSTALLINE SIZE

This application is a C.I.P. of Ser. No. 879,912 filed Nov. 20, 1969 and Ser. No. 100,782 filed Dec. 22, 1970, both now abandoned.

This invention relates to sodium erythorbate and particularly to a process for obtaining it in microcrystalline size. The advantage of this extremely small size crystal is that it presents a relatively enormous surface area and consequently it very rapidly dissolves in water.

Sodium erythorbate (also known as sodium isoascorbate) is extensively used in the curing of meat products. In this use it is combined with sodium nitrite in, e.g., a sausage product, and the erythorbate serves as an in situ reducing agent to convert the sodium nitrite to nitric oxide. This oxide reacts with the myoglobin in the meat to bring about the desired curing action which largely accounts for the characteristic color of the cured sausage. Sodium erythorbate is used because it is less expensive than sodium ascorbate which has this same utility.

Sodium erythorbate has other uses because of its antioxidant properties. It may be used as an antioxidant in foods such as to prolong the freshness of vegetables and fruits particularly after they have been peeled or cut up.

For the sodium erythorbate to have its intended reducing or antioxidant effect it must be in solution in the water present in the environment to which it is added. The sodium erythorbate which is commercially available at the present time is in such a large crystal form that an appreciable time is required for it to all go into solution. After addition of these large crystals to water, a long period of time and constant agitation is required to bring all of it into a uniform solution. If this care is not exercised the initial withdrawals of liquid from the mixture soon after the large crystals are added will be dilute whereas the withdrawals at later times will be too concentrated.

In accordance with the present invention, sodium erythorbate is produced in microcrystalline size and because of its large surface area relative to its mass, dissolves very rapidly in water. consequently, it requires only a short time and a reduced agitation to obtain a thoroughly uniform solution.

In the past, several approaches have been taken to solve the problems of getting minute, quickly soluble crystals. New costly equipment would be needed to grind the present large crystals to a small size but these milled particles do not dissolve quickly. Thus, even if the large crystals of the prior art are milled to approximately the same size of the microcrystals of the present invention they do not dissolve as rapidly as the product of the present process.

Surfactants added to the crystals would be an acceptable way to get a quick solution rate if effective, but obviously their contaminating effects are not as completely desirable as the pure product. Surfactants have been found to not lead to a remarkable increase in solubility rate. A more thorough screening of surfactants, evaluation of conditions of adding the surfactants, and optimization of quantities of surfactants would be a costly research study. It could lead to a product of impaired purity and nonacceptance.

We have found that we can accomplish our objectives inexpensively and without using any surfactant by means of this invention. The feature of this invention is that the microcrystals result from their rapidly salting out from a saturated solution of sodium erythorbate. In getting this saturated solution it is best to dissolve the sodium erythorbate in water at a high temperature so that the greatest possible concentration results but this cannot generally be above 85°C as higher temperatures may cause an increasing decomposition of the sodium erythorbate. Water below 85°C may be used to dissolve the sodium erythorbate but a water of decreasing temperature results in a decreasing weight per volume solution; such smaller amounts of sodium erythorbate per batch size means a less efficient operation. The lowest efficient temperature is about 35°C as only about half as much sodium erythorbate is dissolved compared to the concentration in water at 85°C.

Prolonged stirring of the water and sodium erythorbate will, of course, finally produce a saturated or nearly saturated solution and this may be used in practicing the invention. However, for practical and efficient purposes it is desirable to add the sodium erythorbate to the hot water while stirring for a convenient time and up to a previously determined point of saturation. The saturated solution may be used as such but preferably it is separated from any crystals by filtration, centrifugation or decanting.

The production of the saturated solution may be accomplished by such visual observation but for more efficient commercial operations it is best to be guided by standards which are known to quickly produce a saturated solution. A preferred procedure is to first add the sodium erythorbate to hot water within the temperature range of 78°–86°C during stirring. Heat must be added to maintain this temperature while stirring is continued to assure solution. The water should amount to 150–300 percent, preferably 225 percent, of the weight of the erythorbate so that an approximately fully saturated solution at that temperature results. It is then preferably, but not necessarily filtered through a 20–100 micron sieve to remove undissolved particles. These larger particles may be other processing agents which are also present as will be explained. Adjustment is then made to a temperature of 64°–74°C to get a saturated solution.

The next step in the process is the rapid, and even violent, combination of salt (sodium chloride) with the sodium erythorbate solution with continuous agitation or stirring. The salt should amount to from 16 to 25 percent of the total weight of the system.

The sodium chloride may be added as a granulation or as a water slurry which is preferably below room temperature. It is added rapidly and with agitation to the hot saturated sodium erythorbate solution. Alternatively, the hot saturated erythorbate solution may be added to a sodium chloride slurry which preferably is below room temperature and even approaches the freezing point of the slurry, the addition being rapid and with agitation. The agitation may be due to the turbulence resulting from a high velocity addition of the two liquids. The intermixing should be as rapid as is possible considering the feed rate of the supply means and the sudden load which is imposed on the system.

On a small scale i.e., up to a 20 kg. batch size all of the sodium chloride may be manually dumped in at once or in a period of a few seconds but the time of addition may be extended up to about 60 seconds without a significant change in the microcrystal size. On a large scale, i.e., over a 20 kg. batch size, the method of choice is to add the hot saturated erythorbate solution to a cooled, i.e., 0°–15°C sodium chloride slurry because the rate of addition is not as critical. This is because at whatever rate the hot sodium erythorbate solution is added to the cold salt slurry, there is an instantaneous exposure of the erythorbate to the full quantity of sodium chloride, i.e., there is a rapid, even violent, contact.

The sodium erythorbate microcrystals preferably are recovered in the small scale of a laboratory by filtration using a 200–300 mesh screen, but on a large scale commercial operation the recovery is by centrifugation. The cake is preferably washed with a water-methanol mixture to remove any adhering crystallization liquors and then with methanol to remove the water. It is then dried and this is preferably under vacuum at slightly elevated temperature although pan drying at room temperature is possible. During this process it is preferably that as many as possible of the processing steps be carried out under a nitrogen atmosphere to reduce oxidation of the ascorbate. Very high temperatures are to be avoided for the same reason. The filtration step should be carried out at 0°–5°C for this same reason, and to minimize yield loss due to increased solubility at higher temperatures.

Representative examples are the following:

EXAMPLE 1

To 1,180 ml. of water at 81°–84°C is added 550 gms. of crude (91 percent purity) sodium erythorbate, preferably while stirring. It is advisable to add charcoal or other scavanger to remove organic impurities e.g., 4.35 g. of a decolorizing charcoal. If the sodium erythorbate is 98 percent pure no scavenger addition is necessary. This temperature is maintained by the addition of heat while stirring is continued or initiated until solution is complete. This may be done under nitrogen to minimize oxidation.

The solution should be kept in a closed container and preferably under nitrogen. Stirring is initiated and the temperature is also adjusted preferably to 65°C to thereby produce a saturated solution for maximum yield but it may be in the 60°–70°C range for this small scale process. In larger scale operation (see Example 2) this temperature may be adjusted upward to compensate for heat losses resulting from scale-up effects on heat exchange.

The container is opened and, while stirring, 400 grams of sodium chloride are added as quickly as is possible as by pouring it in rapidly or within several seconds. This causes massive crystallization throughout the liquid, filling all the liquid phase immediately. The crystals which the sodium erythorbate thus form are of microcrystalline size.

The liquid should be cooled rapidly to minimize oxidation, preferably down to 0°–5°C with a brine-ice bath. The liquid-suspension is filtered using a 200–300 mesh sieve and the cake is recovered. Final drying may be on trays at room temperature under nitrogen but it preferably is effected at elevated temperature under vacuum.

A sieve analysis of crystals prepared as above on a weight percent basis is:

| −42/+60 | mesh | 0.7% |
|---|---|---|
| −60/+80 | mesh | 3.7% |
| −80/+100 | mesh | 73.6% |
| −100 | mesh | 22.0% | or, written alternatively:

| | |
|---|---|
| Amount retained on 42 mesh screen | - 0.0% |
| Amount retained on 60 mesh screen | - 0.7% |
| Amount retained on 80 mesh screen | - 3.7% |
| Amount retained on 100 mesh screen | -73.6% |

Remainder (22.0%) passed through 100 mesh screen.

Testing of the rate of solution of this product was by adding 2 gm. of the material to 32 ml. of water at 38°F in a test tube. The tube was inverted and righted repetitively, measuring the time for complete solution.

The rates of solution as compared to a commercial sodium erythorbate are:

| | |
|---|---|
| Commercial sodium erythorbate | 45 to 150 sec. |
| Sample of −42/+60 mesh | 80 sec. |
| Sample of −60/+80 mesh | 37 sec. |
| Sample of −80/+100 mesh | 21 sec. |
| Sample of −100 mesh | 15 sec. |

A sample of −100 mesh was poured into a 50 cc. cylinder; a 100 gram weight was set on top of the crystals to promote caking. The system was allowed to stand for 2½ months. At the end of this time there were some friable clumps. The material dissolved in 21 seconds, tested as above.

The microcrystals of this invention would be used in place of the commercial sodium erythorbate.

EXAMPLE II

In commercial practice, it is customary to add decolorizing charcoal to the solution of sodium erythorbate and to also add a filter aid to assist filtration of the solution. The following is an illustrative example.

1. Heat to 81°–84°C with stirring, the following:

| | |
|---|---|
| Water | 1060 gallons |
| Chelating agent (Tetrasodium Versene) | 30 lbs. |
| Decolorizing charcoal (Nuchar C) | 32.5 lbs. |
| Filter aid (Supercel) | 30 lbs. |

2. Add to the above heated system: Crude sodium erythorbate cake 3,750 lbs., assay weight, assuming 91 percent purity and 5–10 percent methanol.
3. The erythorbate dissolves endothermically. Reheat the system to 81–84°C with stirring.
4. Hold at 81°–84°C for twenty minutes.
5. Filter, while hot through a 20–100 micron sieve under nitrogen to remove the agents in 1. above and other large particles. Use a jacketed filter with steam.
6. Wash residue with 75 gallons hot, deionized water and combine with the filtrate.
7. Keeping filtrate and washings under nitrogen, adjust temperature to 70°–74°C. with stirring. This is necessary in a large scale operation due to the effects of heat exchange.
8. Add sodium chloride, 3,000 lbs. as rapidly as the stirring mechanism permits. There is massive crystallization, filling all of the liquid phase immediately.

9. Cool to 40°C with a water bath; then cool to 0°–5°C with a brine-ice bath.
10. Filter through a 200–300 mesh screen.
11. Wash cake using 90 gal. of 50:50 (w/w) methanol-water cooled to 0°–5°C.
12. Wash the cake with dry methanol until moisture is below 3 percent.
13. Dry in vacuum at 50°C for about 2 hours.

EXAMPLE III

1. Heat the following to 85°C with stirring in a nitrogen inerted vessel (dissolver):

| | |
|---|---|
| Water | 1200 gallons |
| Tetrasodium versene | 30 pounds |
| Nuchar C | 16 pounds |
| Supercel | 30 pounds |

2. Add about 4,450 pounds (pure basis) of crude sodium erythorbate to the above heated system. If purified sodium erythorbate, the three last agents in 1. may be omitted.
3. Reheat the system to 84°–86°C while preparing the crystallizer as follows:
4. Charge 200 gallons of water to the crystallizer and add 3,000 pounds of sodium chloride with agitation. The slurry is preferably, but not necessarily cooled to below room temperature.
5. Begin to pump the hot erythorbate through a filter press to remove the involuble agents added in Step 1 so they do not go to the crystallizer.
6. Remove heat as rapidly as possible from the crystallizer during the transfer. It is standard practice to reduce the batch transfer rate as necessary to maintain the crystallizer temperature at 50°C maximum. Total transfer time is about 2.5 hours but there is constant instantaneous contact between the sodium erythorbate solution and the sodium chloride solution.
7. Wash the filter residue with 50 gallons of water at about the temperature of the batch itself and combine with the filtrate.
8. Cool the batch to 5°C and maintain at this temperature during the centrifugation step.
9. Centrifuge the batch using a machine fitted with a fine i.e., 200 to 300 mesh cloth to prevent solids loss.
10. Each centrifuge load must be washed with about one bed volume of cold 50:50 methanol:water solution to displace any remaining crystallization liquors and then with several bed volumes of methanol to displace essentially all the water from the erythorbate crystals.
11. The methanol is removed by tumble drying under moderate vacuum at 50°C for 6 hours.

The average sieve analysis for material prepared by this procedure follows:

| | Sodium Erythorbate of present invention | | Sodium Erythorbate of prior art | |
|---|---|---|---|---|
| | | | Fine Crystals | Milled Crystals |
| | Test lots | | Test lots | |
| | No. 1 | No. 2 | No. 1 | No. 2 |
| Rate of solution (sec.) | 9 | 13 | 60 | 50 |
| Bulk density (tapped 10 times) (cc/oz.) | 60 | 42 | 28 | — |
| Size, % | | | | |
| on 100 mesh | 0 | 0.2 | | |
| on 200 mesh | 0.8 | 13.0 | | |
| % through 270 mesh | 90.2 | 50.8 | | |
| % passing 35 mesh | | | 98 | |
| % passing 200 mesh | | | 2 | |
| % passing 40 mesh | | | | 100 |
| % passing 200 mesh | | | | 32 |
| | Microscopic Appearance | | | |
| Average size | 50–75 by 10–25μ | 50μ square | 500μ square w/milled debris | 500μ square w/some debris |

EXAMPLE IV

The feature of this example is to illustrate the use of a pipeline mixer to continuously produce microcrystals. This may, for instance, be a Y or T pipe connection, the sodium erythorbate being fed through one branch, the salt slurry being fed through a second branch and the mixture being delivered from the third branch.

1. Same as 1, of Example III.
2. Same as 2, of Example III.
3. Reheat the system to 84–86°C with stirring.
4. Prepare cold, 0°–5°C, sodium chloride slurry. This cooling is desirable to reduce the need for subsequent cooling of the mixture but it is not essential. The concentration should be about 20 pounds of sodium chloride per gallon of water.
5. Mix the hot sodium erythorbate solution with the sodium chloride slurry in the pipeline mixer that will insure complete rapid mixing of the two streams. Proportions should be set to maintain 200–300 milligrams of sodium chloride per gram of water in the combined discharge stream.
6. Cooling, crystallization liquor removal, solids washes, and drying remain the same as in Example III.

EXAMPLE V

Instead of using the three branch pipe mixer of Example IV, a continuous crystallizer or a surge tank with a mixer is used, the two streams to be mixed being discharged therein and the mixture being withdrawn at the same total input rate.

What is claimed is:
1. The method of producing sodium erythorbate of microcrystalline size which comprises forming a substantially saturated solution of sodium erythorbate in water at a temperature between about 35°C and 85°C, then rapidly combining this hot solution with sodium chloride under constant agitation conditions, and separating the formed sodium erythorbate microcrystals from the brine.

2. The method according to claim 1 in which the sodium chloride is added to said hot saturated solution.

3. The method according to claim 1 in which said hot saturated solution is added to a brine slurry of sodium chloride.

4. The method according to claim 1 in which said separation is accomplished by filtering with a 200–300 mesh screen.

5. The method of claim 1 in which the sodium chloride amounts to 50–140 percent of the weight of the sodium erythorbate.

6. The method of claim 1 in which the sodium erythorbate solution is filtered through a 20–100 micron sieve before combination with the sodium chloride.

7. The method of claim 1 in which the filtration of the microcrystals is carried out at 0°–5°C.

8. The method of claim 1 in which the filtration step is carried out under nitrogen.

9. Sodium erythorbate of microcrystalline size having an average size of 50–75$\mu$ by 10–25$\mu$, or 50$\mu$ by 50$\mu$ square, substantially all of which passes through a 100 mesh sieve and goes into solution in not more than 15 seconds when 2 grams of said sodium erythorbate and 32 ml. of water are agitated at 38°F. in a test tube, said sodium erythorbate having a bulk density of greater than 40 cc. per ounce.

* * * * *